United States Patent [19]

Stones

[11] Patent Number: 5,530,944
[45] Date of Patent: Jun. 25, 1996

[54] INTELLIGENT PROGRAMMABLE DRAM INTERFACE TIMING CONTROLLER

[75] Inventor: Mitchell A. Stones, Phoenix, Ariz.

[73] Assignee: VLSI Technology, Inc., San Jose, Calif.

[21] Appl. No.: 114,133

[22] Filed: Aug. 30, 1993

Related U.S. Application Data

[63] Continuation-in-part of Ser. No. 661,738, Feb. 27, 1991, abandoned.

[51] Int. Cl.$^6$ .............................. G06F 1/03; G06F 13/12
[52] U.S. Cl. ........................................ 395/494; 395/432
[58] Field of Search ................................. 395/425, 432, 395/494, 433

[56] References Cited

U.S. PATENT DOCUMENTS 5,307,320  4/1994  Farrer et al. ............................ 395/425
5,394,541  2/1995  Chesley et al. ......................... 395/550
5,418,924  5/1995  Dresser ................................... 395/425

*Primary Examiner*—David L. Robertson
*Attorney, Agent, or Firm*—Hickman Beyer & Weaver

[57] ABSTRACT

The amount of user configuration required for a programmable DRAM interface controller is minimized while assuring adherence to DRAM signal specifications and providing improved DRAM memory transfer performance using a novel intelligent programmable DRAM interface controller which allows programming of TRAS, TRP, TRCD, TCP, TCAS and TCST in units of the cpu clock/2 while obtaining TCSH and TRSH specifications without explicitly programming these parameters. THE TCSH specification is accomplished by holding CAS from deasserting until RAS has deasserted or until the RAS programmed low time has been met. The TRSH specification is accomplished by holding RAS asserted in all normal read or write accesses for at least one time unit after CAS has been asserted, which, in a majority of CPU/DRAM Systems, insures that the DRAM limitation TRSH is satisfied.

8 Claims, 3 Drawing Sheets

| 286/386SX CPU/DRAM SPEED COMBINATIONS | | | | |
|---|---|---|---|---|
| MH<br>ns | 12 | 16 | 20 | 25 |
| 120 | √ | | | |
| 100 | √ | √ | √ | |
| 80 | √ | √ | √ | √ |
| 60 | | √ | √ | √ |

INTELLIGENT PROGRAMMABLE DRAM INTERFACE TIMING CONTROLLER

CROSS REFERENCE TO RELATED APPLICATION

This application is a continuation-in-part of U.S. patent application Ser. No. 07/661,738 filed Feb. 27, 1991 now abandoned.

INTRODUCTION

The present invention generally concerns a very large scale integration (VLSI) circuit as part of an electronic chip which has as its principle application the improvement of personal computer (PC) microprocessor performance and versatility. More particularly, the present invention relates to an intelligent programmable Dynamic Random Access Memory (DRAM) controller which enables a range of Row Address Strobe (RAS), Column Address Strobe (CAS), and related signal high and low pulse widths and start times to be programmed independently and to be based upon one-half of the central processor unit (CPU) normal clock period. In this way, RAS and CAS timings can be customized to fit a particular DRAM/processor match in the most efficient manner.

BACKGROUND OF THE INVENTION

In earlier generations of microprocessor based chip sets, and more particularly those chip sets for those personal computers commonly known as PC/AT architectures, the range of CPU and DRAM speed was more narrow than available with current generations. Chip set designers were making designs to support 80286 microprocessors operating from 6 to 12 MHz. Such systems typically supported affordable dynamic memories with access times of approximately 120 or 100 nanoseconds (ns). Newer technologies have made available 80286 microprocessors operating at up to 25 MHz and 80386DX processors capable of 33 MHz clock rates. DRAM performance has also improved and some current DRAMs have access times as low as 50 ns. These new, faster devices have segregated the chip market between high-, mid-range- and lo-end personal computer systems, creating a need for a device that supports multiple user-programmable DRAM interface options.

Some prior art devices included programmable DRAM controllers which allowed the programmer limited interface options. However, most such DRAM controllers, when operating in a normal read or write mode, required a TCSH specification (minimum CAS asserted hold time relative to RAS asserted start time) and a TRSH specification (minimum RAS asserted hold time relative to CAS asserted start time). Typically, the TCSH DRAM specification is equivalent to the TRAS DRAM specification (minimum RAS asserted time) and if the TCSH specification is violated, the data transfer is unreliable. The DRAM specification could theoretically be violated if, for example, RAS was programmed to meet the TRAS DRAM specification and the minimum RAS asserted to CAS asserted delay time (TRCD DRAM specification) plus the minimum CAS asserted time (TCAS DRAM specification) was less than the total TCSH minimum time. Likewise, the TRSH specification could theoretically be violated if the RAS deassert time occurred before the CAS assert time (if the TRAS time programmed has been less than or equal to the TRCD time programmed) or if the test time programmed does not allow CAS to assert until after RAS assertion time has ended.

Thus a need exists for a device which will allow a range of RAS, CAS and related signals high and low pulse widths and start times to be programmed independently, effectively and correctly. The present invention is directed to fulfill that need by providing independent programming of RAS and CAS to meet the necessary wide range of CPU/DRAM combinations in today's chipset market. The unexpectedly efficient programming of the required DRAM parameters is obtained by minimizing the number of parameters needed to program by satisfying implicitly the TCSH and TRSH DRAM specifications which are based on other programmed values for DRAM specifications such as TRAS, TCAS and TRCD.

BRIEF DESCRIPTION OF THE INVENTION

The present invention comprises an intelligent programmable DRAM controller which insures that the TCSH limit is met by holding CAS from deasserting until RAS has deasserted, or until the RAS programmed low time has been met, which, when programmed in accordance herewith, insures that the TCSH DRAM specification is accomplished. Such a device is particularly applicable in non-pagemode, write cycles with fastpage DRAMs, where the TCAS+TRCD specification is much less than the TRAS specification.

To ensure that the TRSH specification is not violated, the device of the present invention holds RAS asserted in all normal read or write accesses for at least 1 time unit after CAS has been asserted. This 1 time unit ensures that the TRSH specification is met for a majority of CPU/DRAM speed combinations. This is particularly useful in write cycles where the addresses can be delivered from the processor early so RAS can be asserted early, but the write data is delivered later, so CAS assertion times must be held off until later.

Accordingly, it is a principal object of the present invention to provide a VLSI circuit as a part of an electronic chip which provides an intelligent programmable DRAM controller to simplify the use of the programmable DRAM interface through inherent programming of DRAM specification TCSH and TRSH.

Another object of the present invention is to provide a new and improved method for minimizing the amount of user configuration required for a programmable DRAM interface controller while assuring adherence to DRAM signal specifications and providing enhanced DRAM memory transfer performance.

A still further object of the present invention is to provide an intelligent programmable DRAM interface which allows programming of TRAS, TRP, TRCD, TCP, TCAS and TCST in units of CPU clock/2.

Still another object of the present invention is to provide an intelligent programmable DRAM interface controller which provides TCSH and TRSH specifications without explicitly programming these specifications.

This and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

DESCRIPTION OF THE PREFERRED EMBODIMENT

Figures 1, 2:
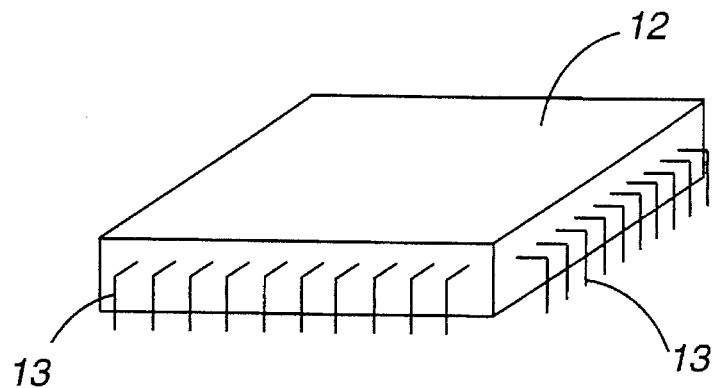
FIG. 1 is a block diagram of a system controller VLSI chip embodying the present invention as a circuit contained therewithin.
FIG. 2 is a table of CPU/DRAM system configurations embodied in the intelligent programmable DRAM interface controller of the present invention.

The DRAM controller of the present invention comprises a circuit within a system controller VLSI chip 12 such as that shown in FIG. 1. The present invention is critical to the proper functioning of such a VLSI chip 12 and is therefore will be described relative to the chip as a whole. Around the perimeter of the chip 12 are pins 13 that allow the transmission/reception of electronic signals between that chip and other chips in the microcomputer set.

FIG. 2 shows a typical range of CPU speed vs. DRAM speed combinations possible with the intelligent programmable DRAM interface controller of the present invention.

Figures 3, 4A, 4B:
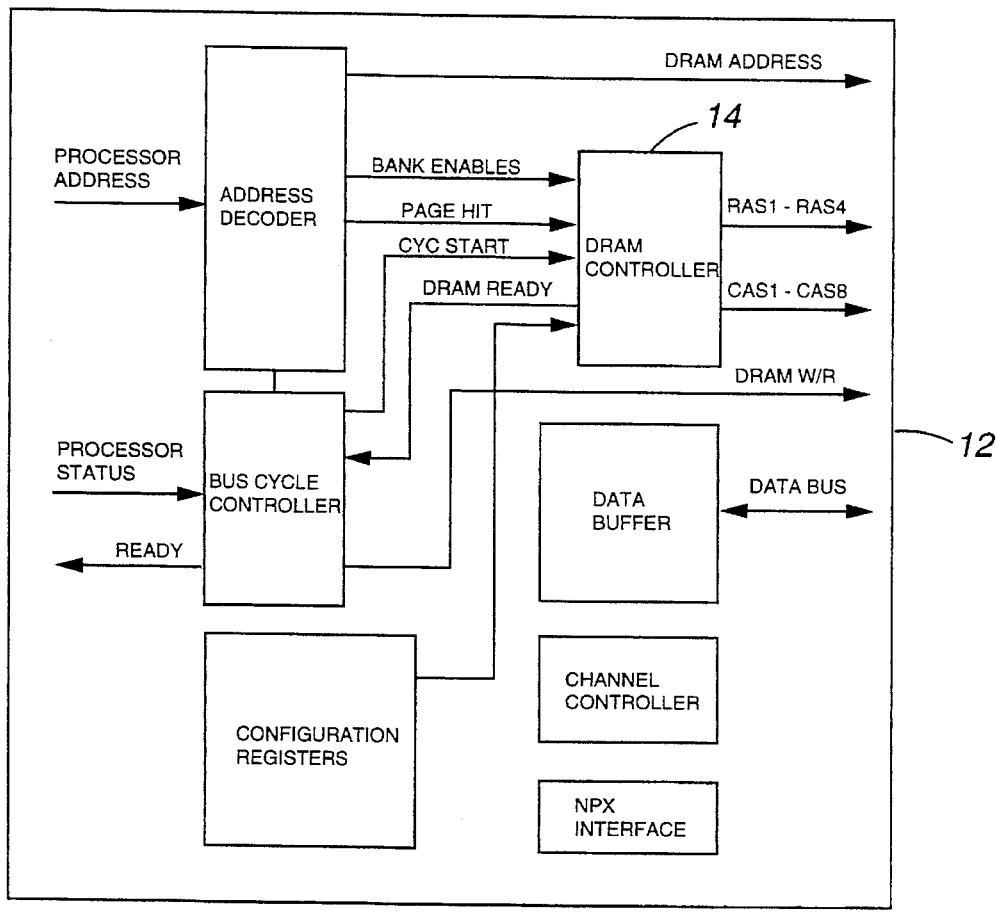
FIG. 3 is a chip diagram of the system controller block embodying the present invention.
FIG. 4A is a table of the system controller programmable DRAM interface registers providing independent control of RAS and CAS for two separate bank pairs.
FIG. 4B shows the programmable ranges for RAS and CAS signals in CLK2 units.

FIG. 3 is a block diagram of the system controller VLSI chip 12 shown in FIG. 1.

The present invention is contained within a DRAM controller block 14 of the system controller VLSI chip 12. The present invention possesses individual counters supporting BIOS or user programmed RAS/CAS parameters which are determined according to the CPU/DRAM system configuration. Through feedback, these counters monitor pulse widths and start times of RAS and CAS completely independent from the memory cycle start (CYC START) timing pulse, bank select (BANK-ENABLE) and same page access (PAGE HIT) signals as shown in FIG. 3.

The memory interface control of the present invention differs from prior art memory controllers of the past because, inter alia, the necessary range of support in the prior art devices was not as wide as the range needed for modern systems. These narrow ranges enables simpler designs. Furthermore, the higher frequency applications allow more granularity in customizing RAS, CAS pulse widths and inter-relative timing.

The system controller VLSI chip 12 embodying the present invention provides a programmable DRAM interface with options for 25 different memory maps including various combinations of ROM shadowing, DOS memory extenders, DRAM sizes, bank populations, interleaving and page-mode operations. This flexibility is provided by the five memory control registers as shown in FIG. 4A. The RAS/CAS optional DRAM parameters are programmed through the RAS and CAS control registers herein called RASTMA, RASTMB and CASTMA, CASTMB registers (see FIG. 4A). This is possible because all RAS/CAS timing is user programmable with the present invention in CLK2 time units which are one half the period of the CPU clock (SYSCLK). The RASTMA and CASTMA registers allow programming of DRAM specifications (ranges shown in FIG. 4B) such as RAS pre-charge (TRP), RAS active or assert time (TRAS), CAS active time for read cycles (TCASA) and CAS active time for write cycles (TCASW), and a CAS start time during write cycles (TDS). This configuration provides a high granularity, especially at higher system clock rates.

Figure 5:
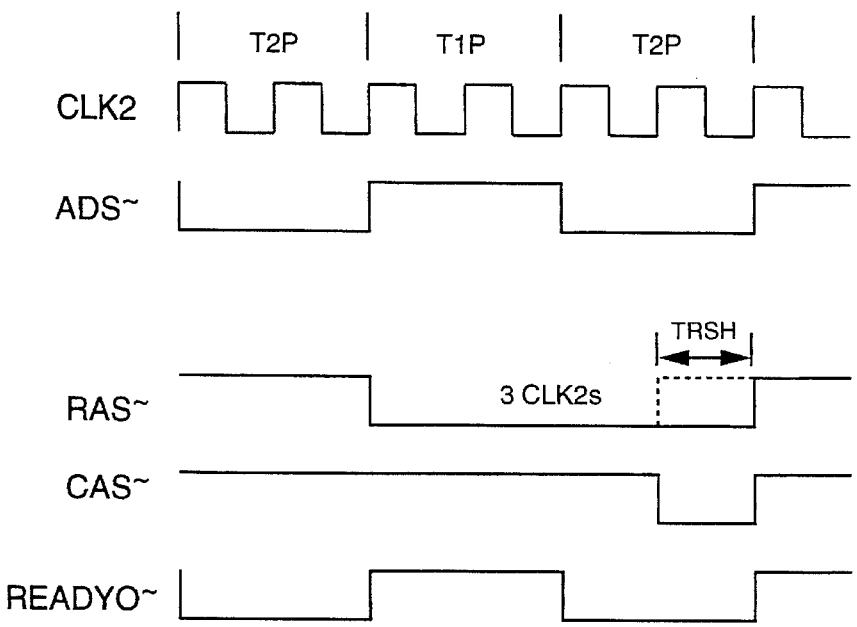
FIG. 5 is a timing diagram showing the non-pagemode RAS/CAS DRAM cycle in which the DRAM controller insures the TRSH limit is met.
Figure 6:
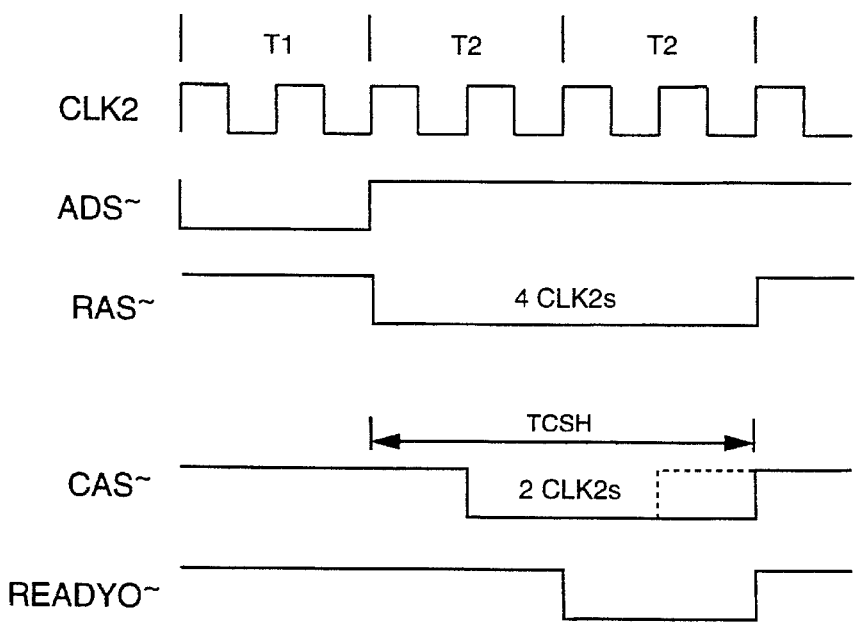
FIG. 6 is a timing diagram in a non pagemode read cycle which inhibits CAS from deasserting until the TCSH limit is met.

One practice of the present invention is demonstrated by referring to FIG. 5 and FIG. 6.

FIG. 5 shows a non-pagemode RAS/CAS DRAM write cycle for a given system in which the RAS assert time (TRAS) pulse width has been programmed for three CLK2 units in duration. The CAS (TCASW) pulse width has been programmed for one CLK2 unit due to the short CAS assert time required for writes in certain DRAM types such as "fast page" DRAMs. The RAS to CAS delay time (TRCD) has been programmed for one CLK2 unit. The CAS start time (TCST) has been programmed for two CLK2s from the time write data is delivered from the CPU (middle of T1P). This requires a write of O hex to the TCST bit. In pipelined mode operation, the CPU addresses are "pipelined" which means they are driven by the CPU with ADS⁻ asserting low. This allows for the RAS⁻ signal to assert at T1P beginning due to ROW address being driven early by the CPU. However, the X86 type pipelined CPU does not begin to drive write data until the middle of T1P. Because CAS asserting must latch in write data, the start of CAS must be delayed until the middle of T2P to allow for data propagation delay to the DRAM. At the middle of the second T2P cycle, RAS has been low for the programmed low time of three CLK2s and should theoretically deactivate. However, through the combined effort of the pulse width counters and an intelligent DRAM control state machine, RAS is held from deactivating until CAS activates (latching in the write data to the DRAM). This action insures correct function of a write sequence to the DRAM by implicitly accomplishing the DRAM TRSH (Minimum time RAS must be active after CAS activates) specification. Thus, the above parameters can be programmed, regardless of the mode in which the CPU is operating, that is, Pipelined or non-pipelined. One such example of this system configuration is obtained with a CPU operating with a 20 MHz processor clock (40 MHz CLK2 rate) and 60 ns access DRAMs in non-pagemode configuration.

FIG. 6 illustrates how the "intelligent" DRAM controller compensates a programmed DRAM parameter from user error. In this case, the processor is assumed to be operating in non-pipelined mode. The cycle is a DRAM write cycle. RAS assert time (TRAS) is programmed for four CLK2s in order to accomplish the DRAM TRAS minimum limit. CAS start time (TCST) is programmed for two CLK2s after CPU write data is driven (middle of T1). The CAS assert time (TCASW) is programmed for two CLK2s due to the small CAS assert time required for the fast page DRAMs. Because most DRAM specification times for TCSH (minimum time before CAS can deactivate after RAS activates) is typically equal to TRAS, this specification could be violated by the independent programming of these parameters. However, in accordance with the present invention, the "intelligent" DRAM controller forces CAS to remain asserted until RAS deasserts, thereby accomplishing the TCSH specification. An example of a system enabling this function to occur would be a 33 MHz processor clock (66 Mhz CLK2 rate) and 80 ns DRAMs in non-pagemode operation.

Referring to FIG. 4A and 4B, which reflect the following system configuration. One practice of the present invention consists of computer using a 386DX microprocessor operating at 33 Mhz (Clock speed, therefore clock/2 (CLK2) is 66 Mhz), a VL82C330 system controller (available from VLSI) containing the DRAM interface circuitry of the present invention, a VL82C332 data buffer device (available from VLSI) (to control the data bus steering for the system), and 80 ns DRAM memory devices.

The following description when read in conjunction with Table 1 shows how TCSH is implicitly held low until at least the CAS deassert occurs, no matter what parameters are programmed into the TRAS, TCASW, TRCD, TSTRT, and TCST parameters.

Table 1 below shows the timing parameters of each device that are critical to the operation of the system. The data shown is typical of that defined in the specification sheets for each device.

TABLE 1

| SYMBOL | DESCRIPTION | MINIMUM | MAXIMUM |
| --- | --- | --- | --- |
| Device | | | |
| DX-Microprocessor operating at 33 Mhz | | | |
| t6 | Address valid data | N/A | 15 ns |
| t12 | Write data valid | N/A | 24 ns |
| t21 | Read data set up | 5 ns | N/A |
| VL82C330-System Controller | | | |
| td34 | CLK2IN to RAS delay | 3 ns | 17 ns |
| td36 | CLK2IN to CAS delay | 3 ns | 16 ns |
| td41 | Addr. to Mem. Addr. delay | N/A | 34 ns |
| VL82C332-Data Buffer | | | |
| td1 | Data to mem. data delay | N/A | 20 ns |
| td18 | Mem. data to data delay | N/A | 20 ns |
| DRAM device | | | |
| TRAS | RAS pulse width limit | N/A | 80 ns |
| TCAS | CAS pulse width | N/A | 20 ns |
| TCSH | CAS hold time | N/A | 80 ns |
| TRCD | RAS to CAS delay | N/A | 25 ns |
| TRAC | Access time from RAS | N/A | 80 ns |
| TCAC | Access time from CAS | N/A | 20 ns |
| TAA | Column address access time | N/A | 40 ns |

One clock cycle is 1/33 Mhz=30 ns which yields a CLK2 of 15 ns. Therefore, to calculate the necessary parameters, the user performs the following analysis from the data in Table 1.

1) RAS pulse width limit.(TRAS)-Bits D0-2 FIG. 4(a)
   TRAS = RAS pulse width limit
   = 80 ns
   = 80 ns/15 ns = 5.33 CLK2s (round up)=>6 CLK2s
2) CAS pulse width limit, write (TCASW)-Bits D6-7
   TCASW = CAS pulse width limit
   = 20 ns
   = 20 ns/15 ns =1.33 CLK2s (round up)=> 2 CLK2s
3) RAS to CAS delay limit (TRCD) - Bit D6
   TRCD = 25
   = 25 ns/15 ns = 1.67 CLK2s (round up)=> 2 CLK2s
4) Memory request start time limit (TSTRT) - Bit D5
   TSTRT = Address delay + addr. to Mem. addr. delay
   − CLK2IN to RAS delay (minimum)
   = 15 + 34 −3 = 46 ns
   46 ns/15 ns = approx. 3 CLK2s to start of memory cycle, therefore:
   = 3 CLK2s
5) CAS assert start time for write cycles (TCST) - Bit D5
   TCST = 1 CLK2 + CPU write data valid + data to memory data delay
   = 15 ns + t12 + td1
   = 15 + 24 + 20 = 59 ns
   59 ns/15 ns = approx. 4 CLK2s
   = 4 CLK2s The above timing analysis is undertaken by the user in order to insure proper operation of the system under worst case timing circumstances. FIG. 5 shows how the DRAM control circuitry would respond to programmed conditions outlined previously. The programmed delay time for RAS pulse width (TRAS) is equal to 6 CLK2s. The RAS to CAS delay time (TRCD) programmed is equal to 2 CLK2s, the CAS assert time for writes (TCST) is 4 CLK2s (from the beginning of the cycle) and the CAS pulse width for write cycles is equal to 2 CLK2s. The CAS hold asserted time relative to RAS assert time (TCSH) for the uPD424800 DRAM is equal to 80 ns. According to these conventional programmed parameters this DRAM specification would be in violation. Using these timing parameters the DRAM controller of the present invention includes intelligent circuitry which implicitly precludes CAS from deasserting until the RAS assert time (TRAS) is accomplished. Because the TCSH specification for most DRAM components is equivalent to the RAS pulse width time (TRAS), the TCSH parameter is implicitly accomplished.

This represents an improvement over other synchronous, independent DRAM parameter programmed controllers which often require an explicit TCSH parameter to be programmed by the user for correct operation.

From the foregoing, it becomes apparent that a new and useful intelligent programmable DRAM interface controller has been herein described and illustrated which fulfills all of the aforestated objectives in a unique fashion. It is, of course, understood that such modifications, alterations, and adaptations as may readily occur to an artisan having the ordinary skills to which this invention pertains are intended within the spirit of the present invention which is limited only by the scope of claims appended hereto.

Accordingly what is claimed is:

1. An intelligent programmable DRAM interface controller for controlling a DRAM, said interface controller comprising:

a plurality of control registers for explicitly programming the DRAM parameters of TRAS, TRP, TRCD, TCP, TCAS and TCST in CPU clock/2 timing units; and control logic for producing CAS and RAS control signals for the DRAM, wherein said control logic implicitly programs the correspondingly required TCSH and TRSH DRAM parameters.

2. A DRAM interface controller according to claim 1 in which the CAS control signal is implicitly prevented from deasserting until the RAS control signal has either deasserted or until the TRAS DRAM parameter has been met, which ever occurs first, thereby implicitly satisfying the TCSH DRAM parameter.

3. A DRAM interface controller according to claim 1 in which the RAS control signal is implicitly held asserted in all normal read and write accesses for at least one clock/2 cycle after the CAS control signal has been asserted, thereby implicitly satisfying the TRSH DRAM parameter.

4. A DRAM interface controller according to claim 2 in which the RAS control signal is implicitly held asserted in all normal read and write accesses for at least one clock/2 cycle after the CAS control signal has been asserted.

5. A method for supplying control signals to a DRAM, said method comprising:

(a) programming TRAS, TCAS, TRCD, TRP, TCP, and TCST timing parameters in CPU clock/2 timing units for use by the DRAM;

(b) producing RAS and CAS control signals for use by the DRAM;

(c) preventing the CAS control signal being produced from deasserting until the RAS control signal is deasserted or the TRAS timing parameter is satisfied; and (d) preventing RAS control signal from deasserting until after the CAS control signal activates.

6. A method as recited in claim 5, wherein said preventing (d) prevents the RAS control signal from deasserting until a CPU clock/2 timing unit after the CAS control signal activates.

7. A method as recited in claim 5, wherein said preventing (d) implicitly satisfies a TRSH timing parameter for the DRAM without having to program the TRSH timing parameter in said programming (a).

8. A method as recited in claim 7, wherein said preventing (c) implicitly satisfies a TCSH timing parameter for the DRAM without having to program the TCSH timing parameter in said programming (a).

* * * * *